No. 644,171. Patented Feb. 27, 1900.
W. HANDLER.
ATTACHMENT FOR BEER DISPENSING APPARATUS.
(Application filed Oct. 7, 1899.)
(No Model.)
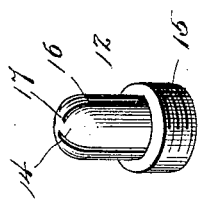
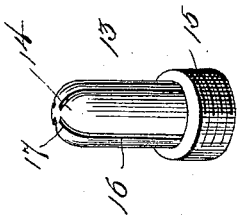
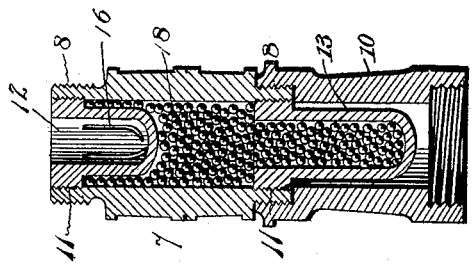
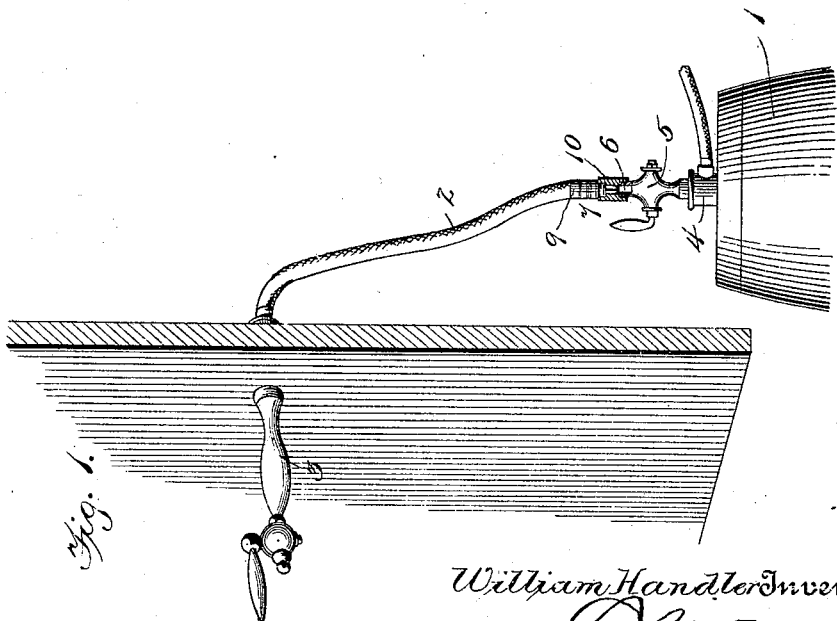
Witnesses
William Handler Inventor
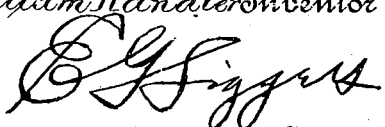
Attorney

United States Patent Office.

WILLIAM HANDLER, OF JERSEYVILLE, ILLINOIS.

ATTACHMENT FOR BEER-DISPENSING APPARATUS.

SPECIFICATION forming part of Letters Patent No. 644,171, dated February 27, 1900.

Application filed October 7, 1899. Serial No. 732,948. (No model.)

*To all whom it may concern:*

Be it known that I, WILLIAM HANDLER, a citizen of the United States, residing at Jerseyville, in the county of Jersey and State of Illinois, have invented a new and useful Attachment for Beer-Dispensing Apparatus, of which the following is a specification.

This invention relates to an attachment for beer-dispensing apparatus.

When beer is first placed on tap or drawn from a barrel, keg, or other vessel, the beer which is first drawn from the vessel is accompanied by a very large amount of foam or froth, and as a result the glasses which are first filled contain more foam than liquid. As the latter portion of the contents of the vessel is drawn off there is very little foam or froth, and as a result the beer is generally flat and unpalatable. Beer in either of the conditions above noted is undesirable to consumers.

The object of this invention is to produce what may be termed an "antifroth" device, which may be applied at any point between the barrel, keg, or vessel and the discharge-outlet of the dispensing-faucet, the said device operating to retard or hold back the froth, while permitting a ready outflow of the liquid, and thereby equalizing the amount of froth delivered with the liquid from the first to the last glass of liquid drawn from the vessel.

The detailed objects and advantages of the invention will appear in the course of the ensuing description.

The invention consists in an antifroth device embodying certain novel features and details of construction and arrangement of parts, as hereinafter fully described, illustrated in the drawings, and incorporated in the claims.

In the accompanying drawings, Figure 1 is a sectional view illustrating a vessel for containing beer, a dispensing-faucet, a tubular connection between the two, and the antifroth device located in said tube. Fig. 2 is an enlarged longitudinal section through the device. Fig. 3 is a detail perspective view of one of the nipples, and Fig. 4 is a similar view of the other nipple.

Similar numerals of reference designate corresponding parts in all the figures of the drawings.

In the accompanying drawings I have illustrated a vessel 1 for containing beer or other liquid of an effervescent character, the said vessel being connected, by means of a tube 2, with a draw-off or dispensing faucet 3. I have also represented the vessel 1 as having a discharge-tube 4, provided with a stop-cock 5, having a tubular extension 6, to which the tube 2 is ordinarily connected.

The antifroth device forming the subject-matter of this invention is preferably arranged adjacent to the stop-cock 5 and between said stop-cock and the adjacent end of the tube 2. The said device comprises, essentially, a hollow tubular casing 7, the opposite ends of which are reduced and exteriorly threaded, as shown at 8, one of the threaded portions being adapted to receive an internally-threaded coupling 9 on the end of the pipe 2 and the other threaded end portion of the casing being designed to receive a threaded coupling 10, which also engages the extension 6 of the stop-cock 5, whereby the parts referred to are connected, as shown in Fig. 1, forming a conduit, by means of which the beer is conveyed by atmospheric pressure in the vessel 1 to the draw-off faucet. The hollow tubular casing 7 is internally screw-threaded at both ends, as shown at 11, to receive a pair of nipples 12 and 13. Each of said nipples is in the form of a cylindrical tube, one end of which is closed by a hollow hemispherical wall 14 and the opposite end of which is open and enlarged to form a threaded flange 15 of a size adapted to screw into one of the threaded ends of the casing 7. The nipple is also provided with longitudinal kerfs or slits 16, each extending from the threaded flange 15 the entire length of the nipple and entering the hemispherical end wall thereof, terminating in an inward radial extension 17. The nipple at the opposite end of the casing is similar in construction, but is materially shorter, and the terminal portions 17 of the longitudinal kerfs or slits instead of extending in a true radial line extend inward in planes parallel to, but at a slight distance from, radial planes, thus enabling said slits or kerfs to be extended farther inward and giving greater capacity to the kerfs in a manner that will be readily understood. The nipples 12 and 13 are also disposed in the same direction, or, in other words, their hemispherical end portions are pointed the same way, the cylindrical portion of one nipple being housed within the casing 7 and the corresponding portion of the other nipple being arranged exteriorly of the casing, while the hollow space within the nipple is in direct communication with the interior of the casing. The device is arranged so that the nipples both face toward the source of supply, being, in other words, opposed to the direction in which the current of liquid is flowing, whereby the liquid strikes first against the outer surface of each nipple, passing therefrom inward through the kerfs or slits and into the interior of the nipple.

Within the casing is a comminuted filling 18, which occupies the entire internal space of the casing and also enters and fills the hollow center of the outwardly-projecting nipple and further surrounds and incloses the inwardly-projecting nipple at the opposite end of the casing. It will thus be seen that the beer or other liquid after entering the outwardly-projecting nipple is forced to pass through the interstices between the comminuted filling. The nipples and the filling thus both act and mutually assist each other to break up the bubbles to a great extent, and thereby materially reduce the amount of foam or froth in the liquid in its passage to the dispensing-faucet. The material with which the casing is filled may be shot or small particles of metal or any comminuted bubble-dissipating material, as may be found desirable and expedient, the essential idea of the filling being that it is composed of a large quantity of small particles of solid matter.

From the foregoing description it will be seen that the device as a whole may be readily detached from its position in the dispensing apparatus and that the nipples may be unscrewed and removed from the casing and the comminuted filling ejected for the purpose of cleansing the parts and refilling the casing with fresh material. By having the longitudinal kerfs in the nipples the flow of the liquid to the dispensing-point is not interfered with or impaired to any extent, and at the same time the liquid is forced to enter the nipples laterally, and as the liquid proper is of greater weight and density than the foam the liquid will force its way through the kerfs or slits and the interstices in the comminuted filling, thereby proceeding to the point of discharge without carrying along with it the bubbles which comprise the foam or froth, a sufficient amount of froth, however, being carried onward with the liquid to give to the beer the desired flavor.

From the foregoing it is thought that the construction, operation, and many advantages of the herein-described apparatus will be readily apparent to those skilled in the art without further description, and it will be understood that various changes in the form, proportion, and minor details of construction may be resorted to without departing from the principle or sacrificing any of the advantages of this invention.

The device hereinabove described also effects a great saving in beer and makes the same more profitable to the dispenser on account of the fact that with the usual apparatus more beer is wasted in drawing a single glass than is contained in the glass itself, owing to the excessive amount of foam. With the device it is also practicable for a person to tap a number of kegs or barrels at the same time and draw from the several vessels as desired, as there is no chance of the liquid becoming flat or stale, the device serving to protect the contents of the vessel from atmospheric action. Without the device it would be practicable to tap but one keg or barrel at a time. The device also acts as a strainer and arrests any small particles of dirt or other foreign matter, which is frequently contained in kegs or barrels of beer.

Although the invention is shown applied to and used in connection with a particular form of beer-dispensing apparatus, it is to be understood that the device is not limited to this use, but may be applied with equal advantage in water and other pipes, serving the function of a strainer for purifying the water or liquid passing therethrough.

Having thus described my invention, what I claim as new, and desire to secure by Letters Patent, is—

1. The combination with a liquid-containing vessel, and a dispensing-faucet, of an interposed sectional casing provided with removable inlet and outlet nipples, and a comminuted filling within the casing held between the nipples, substantially as described.

2. An antifroth device consisting of a hollow casing, and similarly-disposed nipples closing the opposite ends of the casing and each provided with entrance-kerfs, substantially as described.

3. An antifroth device consisting of a hollow casing, inlet and outlet nipples provided with kerfs and closing the ends of the casing, and a comminuted filling within the casing, substantially as described.

4. An antifroth device consisting of a hollow casing, inlet and outlet nipples facing in the same direction, and closing the ends of the casing, and a comminuted filling within the casing surrounding one nipple and partially surrounded by the other nipple, substantially as described.

5. An antifroth device, consisting of a hollow casing, and similarly-disposed nipples closing the opposite ends of the casing and each provided with a series of longitudinal kerfs extending the entire length thereof and entering and terminating in the rounded extremities of the nipples, substantially as described.

6. In an antifroth device, the combination with a pipe or tube, of a nipple having one end open and the other end closed by a hemispherical end portion, and having the closed end facing toward the source of supply, the nipple being provided with a series of kerfs or slits extending lengthwise thereof, and entering and terminating in the end wall of the nipple, substantially as described.

In testimony that I claim the foregoing as my own I have hereto affixed my signature in the presence of two witnesses.

WILLIAM HANDLER.

Witnesses:
L. E. KETCHUM,
PAUL M. HAMILTON.